US012647010B2

(12) United States Patent
Dai et al.

(10) Patent No.: US 12,647,010 B2
(45) Date of Patent: Jun. 2, 2026

(54) CLEANING AND CARING APPLIANCE AND TRANSDUCING APPARATUS THEREOF

(71) Applicant: SHANGHAI SHIFT ELECTRICS CO., LTD., Shanghai (CN)

(72) Inventors: Xiaoguo Dai, Shanghai (CN); Zhenwu Xu, Shanghai (CN)

(73) Assignee: SHANGHAI SHIFT ELECTRICS CO., LTD., Shanghai (CN)

( * ) Notice: Subject to any disclaimer, the term of this patent is extended or adjusted under 35 U.S.C. 154(b) by 238 days.

(21) Appl. No.: 18/701,620

(22) PCT Filed: Sep. 19, 2022

(86) PCT No.: PCT/CN2022/119531
§ 371 (c)(1),
(2) Date: Apr. 16, 2024

(87) PCT Pub. No.: WO2023/071604
PCT Pub. Date: May 4, 2023

(65) Prior Publication Data
US 2024/0413727 A1 Dec. 12, 2024

(30) Foreign Application Priority Data
Oct. 27, 2021 (CN) .......................... 202111254457.1

(51) Int. Cl.
*H02K 33/02* (2006.01)
*H02K 7/10* (2006.01)

(52) U.S. Cl.
CPC ............... *H02K 33/02* (2013.01); *H02K 7/10* (2013.01)

(58) Field of Classification Search
CPC ................................. H02K 7/10; H02K 33/02
(Continued)

(56) References Cited

U.S. PATENT DOCUMENTS

| | | | | | |
|---|---|---|---|---|---|
| 10,603,149 | B2 * | 3/2020 | Wills | ................... | A61C 17/221 |
| 2009/0001838 | A1 * | 1/2009 | Okubo | ................... | H02K 29/08 |
| | | | | | 310/156.16 |

(Continued)

FOREIGN PATENT DOCUMENTS

| | | |
|---|---|---|
| CN | 104617704 A | 5/2015 |
| CN | 104617732 A | 5/2015 |

(Continued)

OTHER PUBLICATIONS

International Search Report of PCT/CN2022/119531.

*Primary Examiner* — Rashad H Johnson
(74) *Attorney, Agent, or Firm* — Kilpatrick Townsend & Stockton LLP

(57) ABSTRACT

A cleaning and caring appliance and a transducing apparatus thereof. A transducer includes a transducer frame and magnets attached to the transducer frame, an elastic assembly and a drive shaft, the elastic assembly includes a transmission arm and an elastic piece held by the transmission arm, and the transmission arm is fixedly connected to the drive shaft, the elastic piece has an outer edge and an inner edges, corresponding to a holding portion of the transmission arm, a recess is formed on the transmission arm, and a recess depth D of the recess is greater than a first fixed coupling width B1 from a bottom surface of the recess and a longitudinal axis. The solution avoids the suppression of a harmonic vibration rotation angle by damping during a harmonic motion, allowing a cleaning assembly such as a brush head to have a larger rotation angle and improving the mechanical efficiency.

20 Claims, 9 Drawing Sheets

(58) Field of Classification Search
USPC ........................................................... 310/15
See application file for complete search history.

(56) References Cited

U.S. PATENT DOCUMENTS

| | | | | |
|---|---|---|---|---|
| 2009/0320219 | A1* | 12/2009 | Takahashi | .............. H02K 33/16 |
| | | | | 15/21.1 |
| 2011/0203061 | A1* | 8/2011 | Takahashi | .............. H02K 33/18 |
| | | | | 310/38 |
| 2015/0280537 | A1 | 10/2015 | Nishiura | |
| 2017/0194848 | A1* | 7/2017 | Meginniss, III | ....... H02K 7/145 |
| 2017/0194849 | A1* | 7/2017 | Meginniss, III | ..... A46B 5/0008 |
| 2018/0351443 | A1* | 12/2018 | Liu | ......................... H02K 33/14 |
| 2019/0328498 | A1 | 10/2019 | Dai et al. | |

FOREIGN PATENT DOCUMENTS

| | | |
|---|---|---|
| CN | 106175957 A | 12/2016 |
| CN | 216819674 U | 6/2022 |

\* cited by examiner

CLEANING AND CARING APPLIANCE AND TRANSDUCING APPARATUS THEREOF

FIELD

The present disclosure relates to the field of cleaning and care appliances, and more specifically, to a transducing apparatus in a cleaning and care appliance.

BACKGROUND ART

It is important for a personal cleaning and care appliance, such as an electric toothbrush, an electric shaver, an electric facial cleaner and an electric shower, to have a transducing apparatus that can convert a reciprocating motion into a desired rotational motion of a cleaning element. Such personal cleaning and care appliances need to have a simple structure, easy assembly, long service life, safety and reliability, and small size.

Known transducing apparatus include an electromagnetic device for generating an electromagnetic force. The electromagnetic device usually generates the electromagnetic force through the interaction between a fixedly mounted driving coil and a magnet mounted on a transducer frame. Such transducing apparatus further include an elastic assembly mounted on a portion of a driving shaft. With the interaction between the electromagnetic device and the elastic assembly, such transducing apparatus can efficiently convert electrical energy into mechanical energy by utilizing a harmonic motion and resonant motion of a harmonic vibration body formed by a cleaning assembly and a transducer.

In the elastic assembly, one end of an elastic piece that generates an elastic force is usually fixed to the driving shaft, which end can perform a reciprocating rotation motion with the driving shaft. The other end of the elastic piece is fixed to a housing of the transducer, which end is stationary.

However, it has been found that when the electromagnetic force is transferred to the driving shaft to make the driving shaft perform the reciprocating rotation motion, a fixed portion between the driving shaft and the elastic piece hinders the elastic deformation of the elastic piece, suppressing a rotation angle of the driving shaft, and reducing the output power of the driving shaft.

Therefore, such transducing apparatuses of the existing personal cleaning and care appliances still have defects and need to be improved.

SUMMARY OF THE DISCLOSURE

In order to overcome the deficiencies in the prior art, the present disclosure provides a transducing apparatus for a cleaning and care appliance, where the transducing apparatus includes a transducer and a driving coil. The transducer includes a transducer frame, and a magnet, an elastic assembly and a driving shaft with a longitudinal axis L, which are attached to the transducer frame; and the elastic assembly includes a transmission arm and at least one elastic piece held by the transmission arm, where the transmission arm is fixedly connected to the driving shaft. The driving coil is arranged opposite to the magnet of the transducer, the transducer is movable relative to the driving coil, an alternating current passes through the driving coil, and an alternating electromagnetic force is generated between the driving coil and the magnet, and drives the transducer to perform a harmonic motion. The elastic piece has an outer edge away from the longitudinal axis L and an inner edge close to the longitudinal axis L, an extension direction of the elastic piece extending from the outer edge to the inner edge is transverse to the longitudinal axis L, the elastic piece has an elastic piece fixed segment held by the transmission arm on one side where the inner edge is located, and when the transducing apparatus is operating, the outer edge of the elastic piece is stationary. The transmission arm has a holding portion that holds the elastic piece fixed segment. Corresponding to the holding portion, the transmission arm is recessed inwardly from the outer surface of the transmission arm to form a recess. The recess has a bottom surface, and the elastic piece extends from the bottom surface of the recess and extends in a space formed by the recess. In the extension direction of the elastic piece, the holding portion has a first fixed coupling width B1 from the bottom surface of the recess to the longitudinal axis, where the first fixed coupling width B1 is greater than or equal to zero. In an extension plane of the elastic piece and on one side where the recess is located, a farthest radial distance between the bottom surface of the recess and the outer surface of the transmission arm on the same side as the recess is defined as a recessed depth D, where the recessed depth D is greater than the first fixed coupling width B1.

According to one embodiments of the present disclosure, a width of a deformable segment of the elastic piece is h, and the first fixed coupling width B1 is less than 20% of the width h of the deformable segment.

According to another embodiment of the present disclosure, the elastic piece extends inwardly from the outer edge toward the longitudinal axis L and across the longitudinal axis L, and the outer edge and the inner edge are located on opposite sides of the longitudinal axis L, the elastic piece fixed segment has a second fixed coupling width B2 on one side of the longitudinal axis L where the inner edge is located in the extension direction of the elastic piece, where the first fixed coupling width B1 is less than the second fixed coupling width B2, and the holding portion is offset relative to the longitudinal axis L.

According to another embodiment of the present disclosure, the holding portion of the transmission arm is completely offset to one side of the longitudinal axis L, and the holding portion and the outer edge of the elastic piece are on opposite sides of the longitudinal axis L.

According to another embodiment of the present disclosure, the second holding width B2 is greater than 1 mm, and the first fixed coupling width B1 is in a range from 0 mm to 3 mm.

According to another embodiment of the present disclosure, the at least one elastic piece of the elastic assembly includes a first elastic piece and a second elastic piece, the recess of the transmission arm includes a first recess and a second recess, the first recess and the second recess are recessed in opposite directions and formed on the transmission arm, and the first elastic piece and the second elastic piece extend from the transmission arm in opposite directions transverse to the longitudinal axis L respectively in spaces of the first recess and the second recess, where recessed depths of the first recess and the second recess are substantially equal.

According to another embodiment of the present disclosure, the transmission arm has a first holding portion for holding the first elastic piece and a second holding portion for holding the second elastic piece, and the first holding portion and the second holding portion are offset to opposite sides of the longitudinal axis L and also staggered in the longitudinal direction; and the first holding portion and the second holding portion are connected through a connection portion. Alternatively, the first elastic piece and the second elastic piece are held by the same holding portion, and the first recess and the second recess are located on both sides of the holding portion.

According to another embodiment of the present disclosure, the elastic piece and a side surface of the recess are separated by a gap in the longitudinal direction.

According to another embodiment of the present disclosure, the transducing apparatus further includes a bearing for supporting and holding the driving shaft.

In one embodiment, the driving shaft includes a first driving shaft portion and a second driving shaft portion, and a proximal end and a distal end of the transmission arm are respectively fixedly connected to the first driving shaft portion and the second driving shaft portion; and the bearing includes a proximal bearing and a distal bearing, which are respectively arranged on the first driving shaft portion and the second driving shaft portion.

In addition, the present disclosure further provides a cleaning and care appliance, which includes the transducing apparatus as described above. The cleaning and care appliance may be one of an electric toothbrush, an electric shaver, an electric facial cleaner, and an electric shower.

In the transducing apparatus according to the present disclosure, the recessed depth of the recess of the transmission arm that accommodates the elastic piece is greater than the first fixed coupling width of the holding portion of the transmission arm that is located on the same side as the recess. In this way, the negative effect on the elastic piece caused by the transmission arm when holding the elastic piece can be minimized on the premise of not affecting the strength of the driving shaft and the connection strength between the driving shaft and the transmission arm. Therefore, the harmonic vibration efficiency of the deformable segment of the elastic piece is ensured, to improve the working efficiency of the entire transducing apparatus.

With the transducing apparatus according to the present disclosure, since the first fixed coupling width in the elastic piece fixed segment held by the transmission arm is less than the second fixed coupling width, damping generated by the transmission arm on the side where the outer edge of the elastic piece is located is reduced, and the suppression of a harmonic vibration rotation angle by damping during a harmonic motion is avoided, allowing a cleaning assembly such as a brush head to have a larger rotation angle and improving the mechanical efficiency.

The transmission arm reduces the first fixed coupling width by means of the offset holding portion, and such structure allows the elastic assembly of the transducer to be smaller in size without affecting the holding effect of the transmission arm.

BRIEF DESCRIPTION OF THE DRAWINGS

For a more complete understanding of the present disclosure, the following description of exemplary embodiments may be considered with reference to the accompanying drawings, in which.

LIST OF REFERENCE SIGNS

Figure 1:
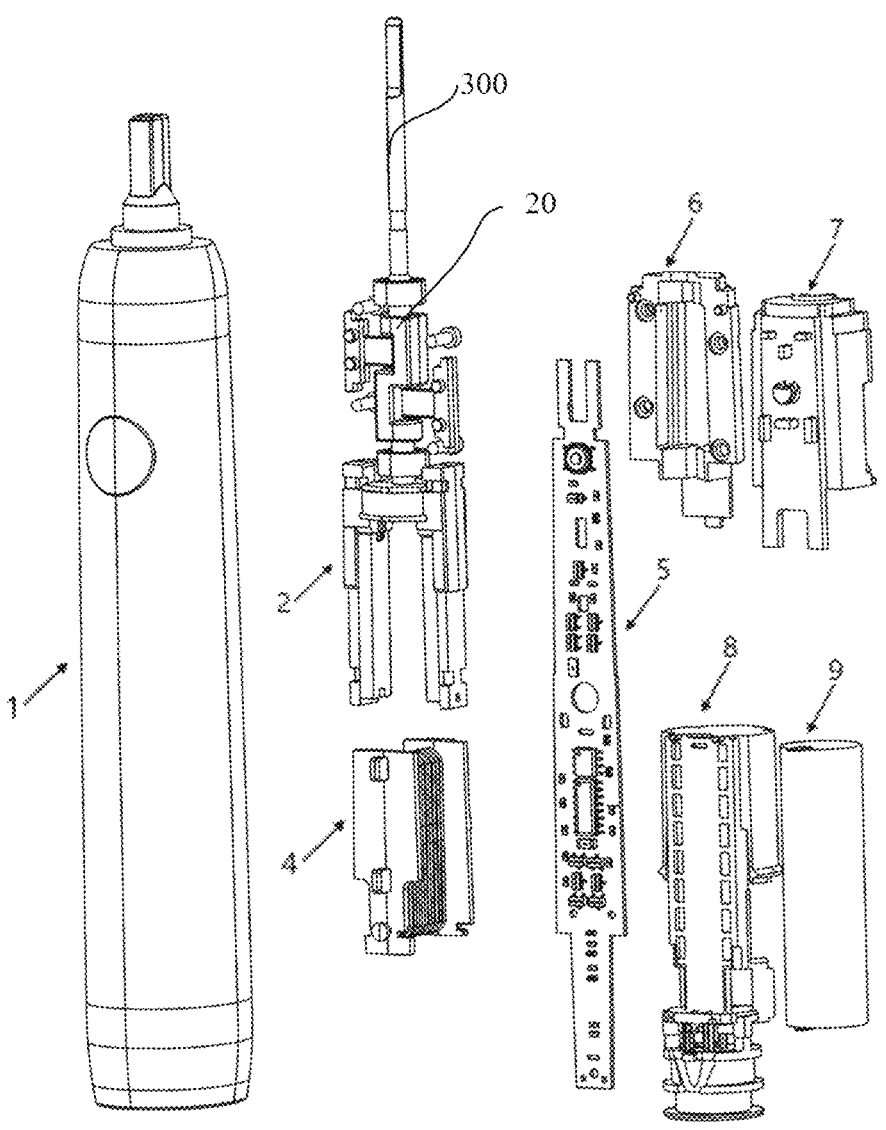
FIG. 1 is an exploded perspective view of a personal cleaning and care appliance and an internal mechanism according to one embodiment of the present disclosure.

1: handle housing
2: transducer
4: driving coil assembly
5: circuit board
6: lower housing
7: upper housing
8: battery compartment
9: battery
22, 22', 22": transmission arm
221: distal end of a transmission arm
222: proximal end of a transmission arm
223, 223', 223": holding portion
225, 225', 225": recess
226: connection portion
24, 25, 24', 24": elastic piece
S: fixed segment of an elastic piece
26, 26', 26": bearing
27: transducer frame
28: transducer magnetic disk
29: magnet
300: driving shaft
30: first driving shaft portion
31: second driving shaft portion
32, 33, 32', 33', 32", 33": gap
35, 20', 21', 20", 21": elastic piece fixing block
41: driving coil frame
42: driving coil
L: longitudinal axis L
B1: first fixed coupling width
B2: second fixed coupling width
h: width of a deformable segment of an elastic piece

DETAILED DESCRIPTION OF EMBODIMENTS

The present disclosure will be further described below in conjunction with particular embodiments and the accompanying drawings, and more details are explained in the following description for the ease of fully understanding the present.

Exemplary embodiments of the present disclosure will be described in more detail below with reference to the accompanying drawings using a typical example in which an electric toothbrush is used as a personal cleaning and care appliance. Although the electric toothbrush is merely used as an example for explanation below, the present disclosure is not limited thereto. The present disclosure is also applicable to an electric shaver, an electric facial cleaner, an electric shower and other cleaning and care appliances that can provide cleaning actions by means of a transducer.

For the sake of clarity, words describing spatial relative positions such as "upper", "lower", "left", "right", "proximal (end)", "distal (end)", "outer", and "inner" are used in this specification to briefly describe a relationship between one element or feature shown in the figures and another element(s) or feature(s), where a direction of a longitudinal axis of a driving coil refers to a direction of a magnetic line generated inside an iron core when a current I flows through the driving coil in a direction parallel to it. "Upper" and "lower" are discussed with respect to the longitudinal axis of the driving shaft, when facing a corresponding view, an upward direction parallel to the longitudinal axis of the driving shaft is defined as "upper", and a downward direction parallel to the longitudinal axis of the driving shaft is defined as "lower". "Left" and "right" are discussed with respect to the longitudinal axis of the driving shaft, when facing a corresponding view, in a direction perpendicular to the longitudinal axis of the driving shaft, a left side of the longitudinal axis of the driving shaft is defined as "left", and a right side of the longitudinal axis is defined as "right". "Proximal end/proximal side" refers to an end or side close to a position where a cleaning action force is applied during use of the cleaning and care appliance. "Distal end/distal side" refers to an end or side away from a position where the cleaning action force is applied during use of the cleaning and care appliance. "Outer" and "inner" are discussed with respect to a distance from the longitudinal axis L, with "outer" being defined as being relatively far from the longitudinal axis L, and "inner" being defined as being relatively close to the longitudinal axis L.

In addition, the word "and/or" used in the present application includes any and all combinations of one or more words of the listed associated words.

Although the word "first" and the like are used in this specification to describe multiple elements or components, these elements or components should not be limited by these words. These words are merely used to distinguish one element or component from another element or component and do not include a "sequence". Therefore, interchange of ordinal numbers of the elements or components discussed below does not exceed the concept and scope of the present disclosure.

Figure 2:
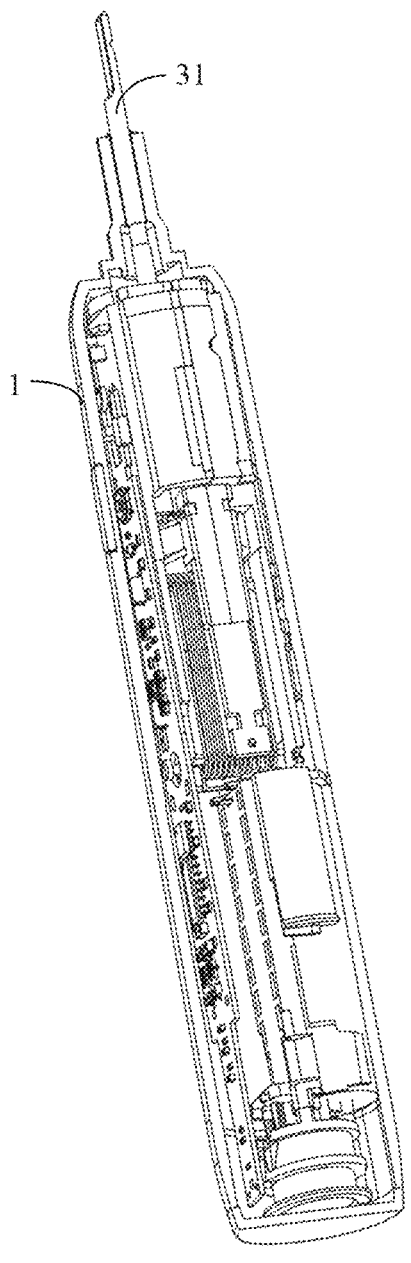
FIG. 2 is a perspective view of a personal cleaning and care appliance and an internal mechanism according to one embodiment of the present disclosure in an assembled state, with part of a housing removed to better illustrate an internal structure.

FIG. 1 and FIG. 2 are respectively an exploded perspective view of a cleaning and care appliance according to one embodiment of the present disclosure and a perspective view thereof in an assembled state. FIG. 1 and FIG. 2 show an electric toothbrush as the cleaning and care appliance. The electric toothbrush mainly includes a handle and a cleaning assembly (not shown) detachably mounted on the handle. The handle includes a handle housing 1 and various functional components mounted in the handle housing 1. The cleaning assembly of the electric toothbrush is usually in the form of a toothbrush head, which includes a cleaning element carrier and a cleaning element distributed on the cleaning element carrier. The carrier of the toothbrush head is mounted on a driving shaft 300 protruding from the handle 1 by means of, for example, a snap coupling. The snap coupling allows the driving handle 1 and the cleaning assembly to be reliably coupled together, and can also allow the driving handle to be conveniently separated from the driving handle to be conveniently separated from the cleaning assembly. The cleaning element may include bristles of various hardnesses, materials, and arrangements.

As shown in FIG. 1, the functional components accommodated in the handle housing 1 of the electric toothbrush mainly include a power supply portion, a control portion, and a transducing apparatus.

Generally, the power supply portion includes a rechargeable battery 9 mounted in a battery compartment 8 and a charging circuit, to provide energy to various functional portions of the electric toothbrush. The control component mainly includes a circuit board 5 for controlling various working modes of the electric toothbrush and on or off of the electric toothbrush, and the control portion includes a trigger portion such as a switch for starting and stopping the operation of the electric toothbrush. The transducing apparatus is configured to convert input electrical energy into mechanical energy that provides a reciprocating motion of the cleaning assembly. These functional portions are basically accommodated in an inner cavity formed by the handle housing 1. As shown in FIG. 2, starting from a distal side of the electric toothbrush, the power supply portion and the transducing apparatus are arranged in sequence in the inner cavity of the housing 1. The driving shaft 300 of the transducing apparatus protrudes from an opening formed at a proximal end of the housing 1.

Figure 3:
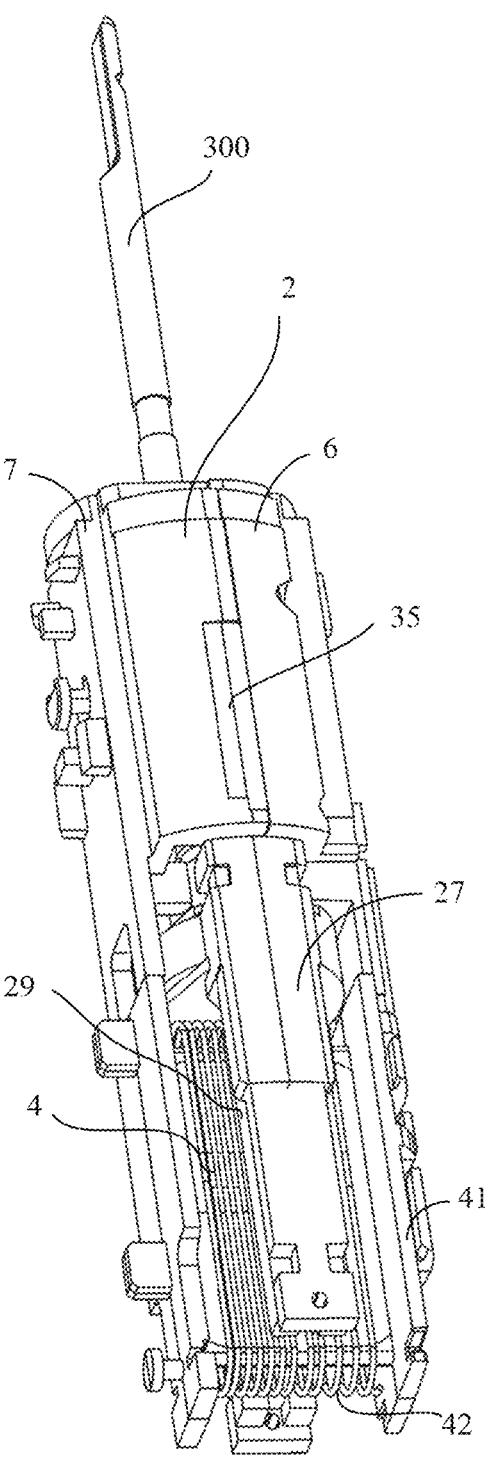
FIG. 3 is a perspective view of a transducing apparatus according to one embodiment of the present disclosure in an assembled state.

FIG. 3 shows a transducing apparatus according to one embodiment of the present disclosure. The transducing apparatus mainly includes a transducer 2 and a driving coil assembly 4, and the driving coil assembly 4 of the transducing apparatus is arranged opposite to a portion of the transducer 2.

The transducer 2 mainly includes a transducer frame 27, and a magnet 29, an elastic assembly and a driving shaft 300, which are attached to the transducer frame 27. It can be clearly seen from FIG. 4 that the magnets 29 includes a first magnet and a second magnet arranged opposite to each other and separated by some space. Each magnet is fixedly coupled to a transducer magnetic disk 28 of the transducer frame 27 on one side, for example, by means of glue, screws, injection molding, etc. These magnets are located at a distal end of the electric toothbrush away from the cleaning element. The magnets 29 become a portion of the entire transducer frame 27, and the movement of the magnets 29 will drive the entire transducer frame 27 to move together.

The driving coil assembly 4 usually includes a driving coil frame 41 and a driving coil 42. As shown in FIG. 3, the driving coil 42 is arranged in the space between the first magnet 29 and the second magnet 29, and both sides of the driving coil 42 are opposite to the magnets 29.

Further, the driving shaft 300 is fixedly attached to the transducer frame 27, and the driving shaft 300 extends substantially along a longitudinal axis L, while the elastic assembly is fixedly connected to the driving shaft 300 of the transducer 2. During use, elastic forces generated by elastic pieces 24, 25 of the elastic assembly can be directly transferred to the driving shaft 300.

Figure 4:
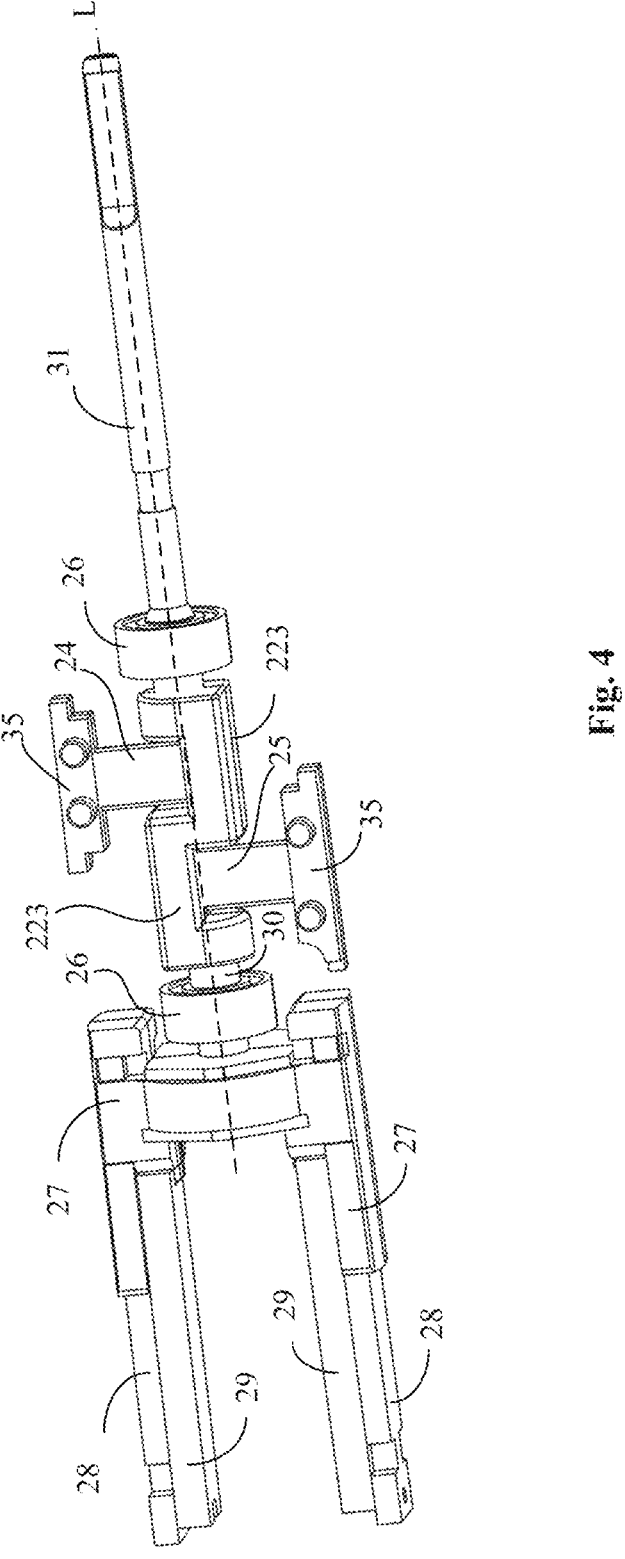
FIG. 4 is a perspective view of a transducer of a transducing apparatus according to one embodiment of the present disclosure.

In one embodiment according to the present disclosure, as shown in FIG. 4, in one embodiment, the driving shaft 300 of the transducer 2 includes a first driving shaft portion 30 close to the magnets 29 and a second driving shaft portion 31 away from the magnets 29. The first driving shaft portion 30 and the second driving shaft portion 31 are arranged substantially concentrically about the longitudinal axis L. The elastic assembly includes a transmission arm 22 and two elastic pieces 24, 25. The transmission arm 22 of the elastic assembly is fixed between the first driving shaft portion 30 and the second driving shaft portion 31 by means of its proximal and distal ends along the longitudinal axis L. The two elastic pieces 24, 25 are fixed at their two edges transverse to the direction of the longitudinal axis L. In one embodiment, each of the elastic pieces 24, 25 has an outer edge away from the longitudinal axis L and an inner edge close to the longitudinal axis L. At the inner edges of the elastic pieces 24, 25, the elastic pieces 24, 25 are fixed by the transmission arm 22, while at the outer edges of the elastic pieces 24, 25, as shown in FIG. 3, the elastic pieces 24, 25 are fixed by the housing of the transducer 2.

When the housing of the transducer 2 includes an upper housing 7 and a lower housing 6, the outer edges of the elastic pieces 24, 25 are clamped and fixed between the upper housing 7 and the lower housing 6 through elastic piece fixing blocks 35. The upper housing 7 and the lower housing 6 of the transducer 2 can be fixed together by means of a fastener or a fastening structure. In such an arrangement, the outer edges of the elastic pieces 24, 25 are fixed edges or stationary edges, while the inner edges of the elastic pieces 24, 25 are movable edges or harmonic vibration edges that move with the driving shaft 300.

When a user triggers a switch button on the housing 1 of the electric toothbrush to start the electric toothbrush, the power supply portion of the electric toothbrush excites the driving coil assembly 4 under the control of the control portion, and an alternating current at a certain frequency passes through the driving coil assembly 4, and the interaction between a magnetic field formed by the two magnets 29 and the energized driving coil assembly 4 generates an electromagnetic force, which forms an electromagnetic torque M1 on the transducer 2. Since the current I flowing through the driving coil assembly 4 is alternating, a direction of the electromagnetic torque M1 on the transducer 2 is accordingly alternating, and the transducer frame 27 and the components fixed thereon perform a reciprocating action about the longitudinal axis L under the action of a reciprocating force couple from the driving coil assembly 4. The transmission arm 22 in the elastic assembly performs the reciprocating motion along with the driving shaft 300. Since the outer edges of the elastic pieces 24, 25 are kept fixed or stationary by the housing of the transducer 2, while portions of the elastic pieces 24, 25 held in the transmission arm 22 perform the reciprocating motion along with the transmission arm 22, in this case, the elastic pieces 24, 25 undergo reciprocating bending elastic deformation, to achieve a harmonic motion of the transducer 2 and the cleaning assembly attached thereto.

It should be understood that the magnets and coils may be used in other alternative implementations, for example, the magnets may be arranged around and close to the driving shaft, while the coils may be arranged around the magnets and opposite to different polarity sides of the magnets, and away from the driving shaft. The above arrangement of the magnets and coils does not affect the implementation of the present disclosure and will not be described again here.

Figure 5:
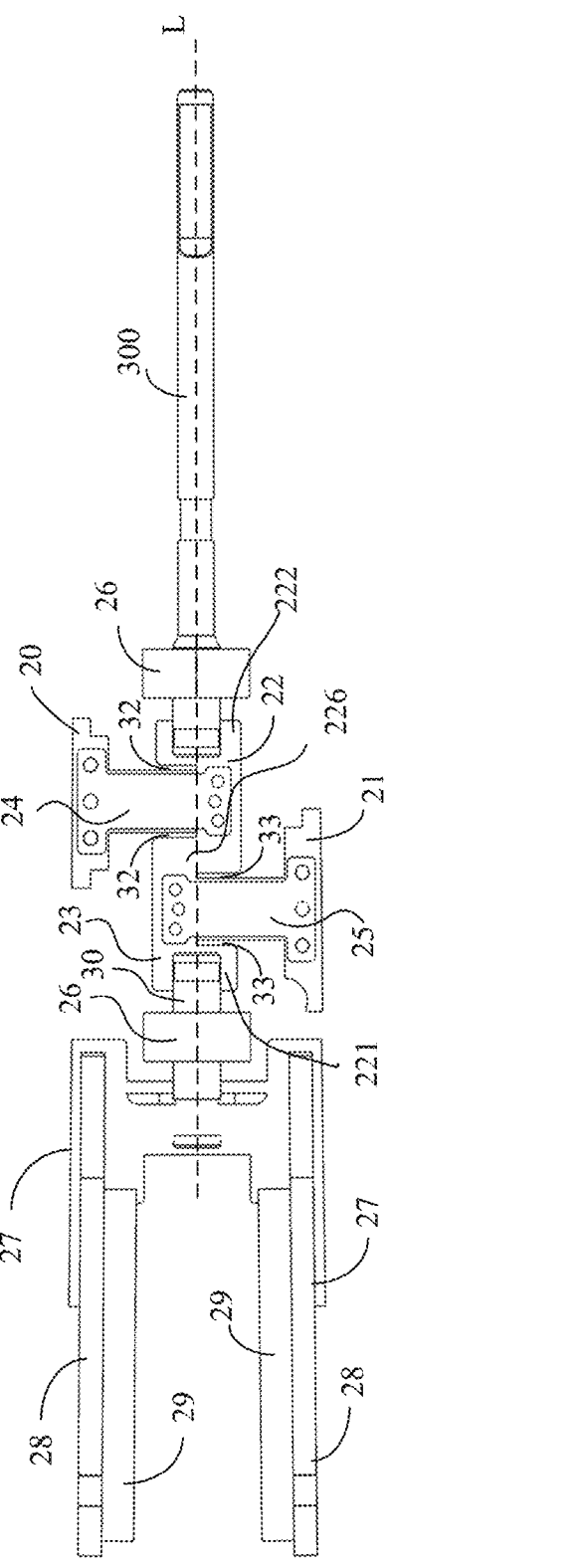
FIG. 5 is a plan view of the transducer in FIG. 4.

In order to better constrain reciprocating rotation of the driving shaft 300 about the longitudinal axis L, as shown in FIG. 4 and FIG. 5, the first driving shaft portion 30 and the second driving shaft portion 31 are each provided with a bearing 26, such as a rolling bearing 26. An inner ring of the rolling bearing 26 is fixed to the driving shaft 300, and an outer ring of the rolling bearing 26 may be fixed inside the housings 6 and 7 of the transducer 2. In this way, the two rolling bearings 26 are arranged on both sides of the elastic assembly in the direction of the longitudinal axis L. In this way, when the harmonic motion of the transducing apparatus occurs, the rolling bearing 26 can support the driving shaft 300 and the elastic assembly thereon, and limit the motion of the driving shaft 300 to a reciprocating rotation motion about the longitudinal axis L.

Next, a connection structure between the elastic pieces 24, 25 and the transmission arm 22 according to some embodiments of the present disclosure will be described specifically with reference to FIG. 6.

Figure 6:
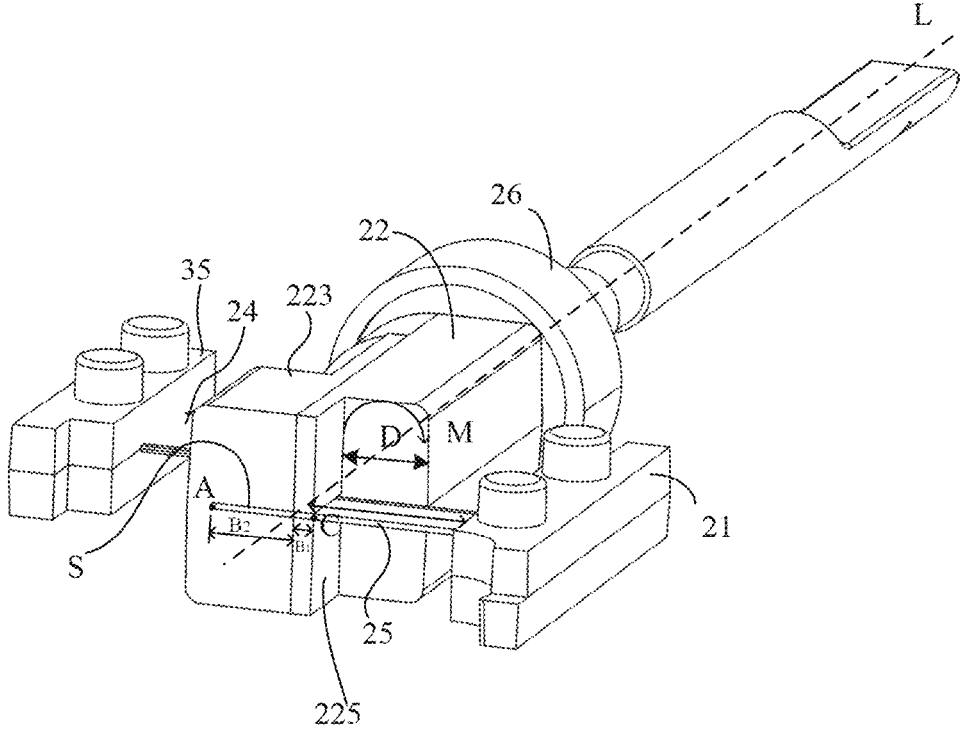
FIG. 6 is a cross-sectional view showing a transmission arm of a transducer according to one embodiment of the present disclosure, with a structure of a connection portion between an elastic piece and the transmission arm shown.

FIG. 6 is a perspective view showing a cross-section of the transmission arm 22, in which the elastic pieces 24, 25 held in the transmission arm 22 in an initial position in the form of a sheet are shown in a cutaway position. The elastic pieces 24 and 25 are respectively held in two recesses 225 formed in the transmission arm 22 by two holding portions 223 of the transmission arm 22. The elastic pieces 24, 25 extend in the recesses 225, and the recesses 225 provide a space for the elastic deformation of the portions of the elastic pieces when the harmonic motion occurs. The recess 225 is formed concavely toward the longitudinal axis L relative to an outer surface of the transmission arm 22. Each recess 225 has a bottom surface from which the elastic pieces 24 and 25 extend. Each recess 225 has two side surfaces (i.e., two surfaces of the recess 225 along the longitudinal axis L). In this embodiment, the side surfaces are flat surfaces, but it should be understood that in other embodiments, the side surfaces of the recesses 225 may also be arcuate surfaces or have a combined shape of flat and arcuate surfaces.

The elastic pieces 24, 25 have outer edges away from the longitudinal axis L and inner edges close to the longitudinal axis L, and an extension direction of each elastic piece extending from the outer edge to the inner edge is transverse to the longitudinal axis L. In one embodiment, the extension direction of each of the elastic pieces 24, 25 is perpendicular to the longitudinal axis L. As shown in FIG. 6, the elastic pieces 24, 25 extend inwardly from their outer edges toward the longitudinal axis L and across the longitudinal axis L and the outer edges and the inner edges of the elastic pieces 24, 25 are located on opposite sides of the longitudinal axis L. In one embodiment, the longitudinal axis L extends through the elastic pieces 24, 25.

The elastic pieces 24, 25 have elastic piece fixed segments S held near the inner edges by the holding portions 223 of the transmission arm 22. In one embodiment, the "elastic piece fixed segment" here refers to an elastic piece segment with a certain length in the extension direction of each of the elastic pieces. One or two surfaces of such elastic piece segment are in direct contact with the holding portion 223 of the transmission arm 22 and are held and no elastic deformation action can occur.

As shown in FIG. 6, the elastic piece fixed segment refers to an elastic piece segment between point A and point C, which is held inside the holding segment 223. Point A here is also where the inner edge of the elastic piece 25 is located, and point C is where the bottom surface of the recess 225 is located.

It can be clearly seen from FIG. 6 that on the side of the longitudinal axis L where the outer edge is located, each holding portion 223 of the transmission arm 22 has a first fixed coupling width B1 in the extension direction of each of the elastic pieces 24, 25, where the width B1 refers to a distance from the bottom surface of the recess 225 to the longitudinal axis L. On the side of the longitudinal axis L where the inner edge is located, the elastic piece fixed segment S has a second fixed coupling width B2 in the extension direction of the elastic piece. In other words, when the bottom surface of the recess 225 and the outer edge of the elastic piece are located on the same side, as shown in FIG. 6, the second fixed coupling width B2 is a distance from the inner edge of the elastic piece to the longitudinal axis L; or when the outer edge of the elastic piece and the bottom surface of the recess 225 are located on opposite sides of the longitudinal axis L, the second fixed coupling width B2 is a distance from the bottom surface of the recess 225 to the inner edge of the elastic piece. The elastic pieces 24, 25 each have a deformable segment, the width of which is denoted as h. The "deformable segment" of the elastic piece generally refers to an unconstrained elastic piece segment of a certain length held between the inner edge and the outer edge, specifically, to an elastic piece segment between the holding portion of the transmission arm and the elastic piece fixing block. A farthest radial distance between the bottom surface of the recess 225 and the outer surface of the transmission arm 22 on the same side as the recess is defined as a recessed depth D of the recess 225. In particular, the recessed depth D is greater than the first fixed coupling width B1. In the embodiment shown in FIG. 6, the flat bottom surface of the recess 225 is substantially parallel to the flat outer surface of the transmission arm 22, the recessed depth D is a distance between the two flat surfaces, while the first fixed coupling width B1 is greater than zero, that is, a portion of the holding portion 223 fixedly coupled to the elastic piece fixed segment S and the outer edge of the elastic piece are located on the same side of the longitudinal axis L. In one embodiment, the first fixed coupling width B1 may be equal to zero. It should be understood that, in the present disclosure, in a case that the first fixed coupling width B1 is zero, a structure in which the entire holding portion 223 is offset to the side of the longitudinal axis L opposite to the outer edge of the elastic piece is involved. In this way, the elastic piece fixed segment S only extends between the longitudinal axis L and the inner edge, and does not extend to the side of the longitudinal axis L where the outer edge of the elastic piece is located. In other words, when the bottom surface of the recess 225 is located on the longitudinal axis L, or the bottom surface of the recess 225 and the outer edge of the elastic piece are respectively located on both sides of the longitudinal axis L, the first fixed coupling width B1 is considered to be equal to zero, i.e., the holding portion does not have the first fixed coupling width, and only has the second fixed coupling width B2.

In addition, the first fixed coupling width B1 is less than 20% of the width h of the deformable segment, and the first fixed coupling width B1 of the elastic pieces 24, 25 may be less than 3 mm. Assuming that the holding portion of the transfer arm only has the first fixed coupling width B1 instead of the second fixed coupling width B2, when a ratio of the first fixed coupling width B1 to the width h of the deformable segment of the elastic piece (as shown in FIG. 6) is 0.0339 (B1/h=0.0339), a rotation angle of the driving shaft 300 is α3; or when the transfer arm 22 only has the second fixed coupling width B2 instead of the first fixed coupling width B1, the rotation angle of the driving shaft 300 is set to be α4, and according to mechanics principles, it can be calculated that α3 is approximately 0.9 times α4. In one embodiment, the presence of the first fixed coupling width B1 suppresses the rotation angle of the driving shaft. The greater the value of B1/h, the smaller the rotation angle of the driving shaft, while the second fixed coupling width B2 can fully release the rotation angle of the driving shaft. When the first fixed coupling width B1 and the second fixed coupling width B2 are present at the same time, the rotation angle of the driving shaft only depends on the effect of the first fixed coupling width B1, that is, the rotation angle of the driving shaft is suppressed, where α3 is a suppressed rotation angle of the driving shaft, and α4 is a rotation angle of the driving shaft without suppression. When B1/h=0.2, according to mechanics principles, α3 at this time is calculated to be approximately 0.52 times α4. 0.52 times is acceptable in actual engineering, so B1/h is required to be less than or equal to 0.2. The width h of the elastically deformable segment of the elastic piece usually ranges from 5 mm to 15 mm, so the first fixed coupling width B1 should usually not be greater than 3 mm.

In one embodiment, the first fixed coupling width B1 is less than the second fixed coupling width B2. The purpose of the second fixed coupling width B2 is to fasten the elastic pieces 24, 25 and transfer the electromagnetic torque from the magnets to the transmission arm 22 and the elastic pieces 24, 25, to drive the driving shaft 300 to perform reciprocating rotation. The presence of the first fixed coupling width B1 may hinder the elastic deformation of the elastic pieces, suppressing the rotation angle of the driving shaft 300, and reducing the output power of the driving shaft. When the first fixed coupling width B1 is set to be less than the second fixed coupling width B2, the suppression of the rotation angle of the driving shaft 300 can be effectively reduced, and the output power of the driving shaft 300 can be increased.

The size of the second fixed coupling width B2 should be set to be sufficient to transmit the electromagnetic torque. In practice, it is found that the size of the second fixed coupling width B2 has almost no impact on the elastic deformation of the elastic pieces 24, 25, but the second fixed coupling width B2 has a direct impact on stable and effective transfer of the electromagnetic torque to the transmission arm. It is proved by experiments that an optimal choice is that when the first fixed coupling width B1 is equal to zero, in order to transfer the electromagnetic torque to the transmission arm 22 stably and effectively, the second fixed coupling width B2 should be greater than or equal to 1 mm.

In order to realize that the first fixed coupling width B1 of the elastic pieces 24, 25 is less than the second fixed coupling width B2, while the miniaturization of the entire elastic assembly is realized, as shown in FIG. 5, the transmission arm 22 according to one embodiment of the present disclosure particularly has a curved-arm shape with multiple tortuous sections.

In one embodiment, the transmission arm 22 includes the distal end and the proximal end fixedly connected to the first driving shaft portion 30 and the second driving shaft portion 31, respectively, both of which are connected to the corresponding driving shaft portions 30, 31 along the longitudinal axis L in alignment. The transmission arm 22 further includes the holding portions 223 for holding the elastic piece fixed segments S between the distal end 221 and the proximal end 222, where the holding portions 223 are offset relative to the longitudinal axis L, and thus also offset relative to the proximal end and distal end fixedly coupled to the driving shaft. In the case that the first fixed coupling width B1 is zero, the holding portions 223 are completely offset to one side of the longitudinal axis L.

In addition, in order to enable the elastic pieces 24, 25 to fully and freely elastically deform in the recesses 225 without any hindrance, in one embodiment, the elastic pieces 24, 25 are separated from the side surfaces of the recesses 225 by gaps 32 and 33 in the direction of the longitudinal axis L.

For the elastic assembly with two elastic pieces 24, 25, the transmission arm 22 has two holding portions 223. The two holding portions 223 are spaced in the direction of the longitudinal axis L, and are offset in opposite directions relative to the longitudinal axis L. As shown in FIG. 5, the holding portion 223 close to the driving shaft portion 31 is offset to the right side of the longitudinal axis L, while the holding portion 223 close to the driving shaft portion 30 is offset to the left side of the longitudinal axis L. The offsets of the two holding portions 223 relative to the longitudinal axis L may be the same. The two holding portions 223 are connected through a connection portion 226, where the width of the connection portion 226 is substantially consistent with the widths of the distal end 221 and the proximal end 222 of the transmission arm 22.

The two offset holding portions 223 form two recesses 225 on the transmission arm 22. The length of each of the recesses 225 in the direction of the longitudinal axis L is greater than the length of the elastic pieces 24, 25 in the longitudinal direction, and the elastic pieces 24, 25 and both sides of the recesses 225 are respectively separated by certain gaps 32 and 33 in the direction of the longitudinal axis L, regardless of the size of the gaps as long as it can ensure that the transmission arm 22 and the elastic pieces do not contact in the longitudinal direction.

With the transducing apparatus according to one embodiment of the present disclosure, the reciprocating electromagnetic torque from the magnets 29 acts on the elastic pieces 24, 25, the transducer 2 and the cleaning element perform harmonic vibration under the alternating electromagnetic torque, and the driving shaft 300 is restrained by the bearings to perform reciprocating rotation about the longitudinal axis L of the driving shaft 300. As shown in FIG. 6, the elastic piece fixed segment is an elastic piece segment between point A and point C. When the electromagnetic torque is applied on the elastic pieces 24, 25 at point C, that is, on the elastic pieces 24, 25 between the outer edges of the elastic pieces 24, 25 and the longitudinal axis L, the maximum rotation angle of the driving shaft 300 is α1. When the electromagnetic torque is applied on the elastic pieces 24, 25 at point A, that is, on the inner edges of the elastic pieces 24, 25 on one side of the longitudinal axis L opposite to the other side where the outer edge is located, the maximum rotation angle of the driving shaft 300 is α2. Since the driving shaft 300 is constrained by the bearings to perform reciprocating rotation about the axis L of the driving shaft 300, and according to the solid mechanics principles, as the elastic piece fixed segment S is held by the transmission arm 22, this elastic piece segment cannot elastically deform, and the rotation angle α1 is less than the rotation angle α2 under the same electromagnetic torque. Damping is formed by a segment of the transmission arm 22 between point C and the longitudinal axis L on the elastic pieces 24 and 25, which reduces the mechanical efficiency. When the first fixed coupling width B1 is set to be less than the second fixed coupling width B2, especially when the first fixed coupling width B1 is less than 20% of the adjacent elastic piece deformable width h, the damping from the portion of the transmission arm 22 on the side where the outer edge is located is significantly reduced, and the mechanical efficiency can be effectively improved. According to an optimal solution, the first fixed coupling width B1 may be set to zero, that is, the elastic piece fixed segment S is only present between the longitudinal axis L and the inner edge. Therefore, no portion of the elastic piece which is between the longitudinal axis L and the outer edge of the elastic piece as the fixed edge is constrained by the transmission arm 22. Since the damping from this portion of the transmission arm 22 is eliminated, the mechanical efficiency is greatly improved.

In addition, if there is an action force of the transmission arm 22 and the elastic piece between the outer edge of the elastic piece and the longitudinal axis L of the driving shaft 300, this action force will periodically generate an impact force between the bearing and the driving shaft 300, resulting in a high frequency noise, and if the first fixed coupling width B1 is set to zero, the noise can also be effectively eliminated.

Figure 7:
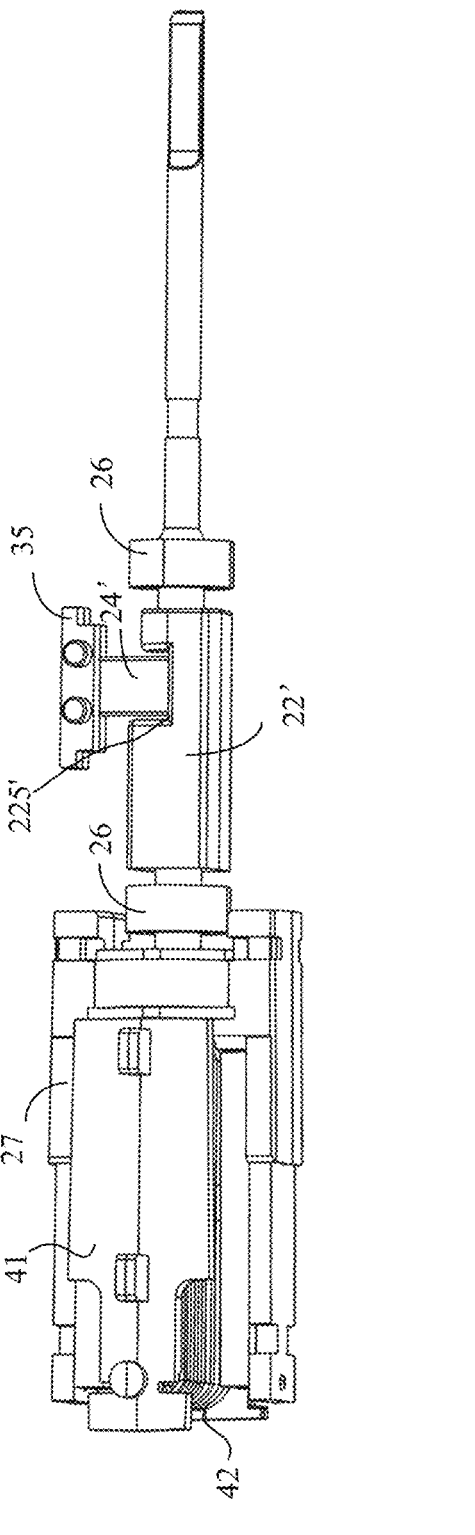
FIG. 7 is a perspective view of a transducing apparatus according to another embodiment of the present disclosure.

FIG. 7 shows a transducing apparatus according to another embodiment of the present disclosure. The transducing apparatus also has a transducer and a driving coil assembly. The device and method for generating an electromagnetic force are consistent with other embodiments and will not be described again here.

This transducing apparatus has a difference that a transmission arm 22' is provided with only one recess 225' and one elastic piece 24' accommodated in a space of the recess 225'. The elastic piece 24' has an outer edge away from the longitudinal axis L and an inner edge close to the longitudinal axis L. At the inner edge of the elastic piece 24', the elastic piece 24' is fixed by the transmission arm, while at the outer edge of the elastic piece 24', the elastic piece 24' is fixed by the housing of the transducer 2. The outer edge of the elastic piece 24' is a fixed edge or a stationary edge, while the inner edge of the elastic piece 24' is a movable edge or a harmonic vibration edge.

Similar to the previous embodiment, the elastic piece 24' extends inwardly from its outer edge toward the longitudinal axis L and across the longitudinal axis L, and the outer edge and the inner edge of the elastic piece 24' are located on opposite sides of the longitudinal axis L. The elastic piece 24' has an elastic piece fixed segment held by the transmission arm 22' near the inner edge. Consistent with other embodiments, the "elastic piece fixed segment" here refers to an elastic piece segment with a certain length in the extension direction of each of the elastic pieces. One or two surfaces of such elastic piece segment are in direct contact with a main body of the transmission arm and are held and no elastic deformation action can occur. A holding portion of the transmission arm 24' has a first fixed coupling width B1 in the extension direction of the elastic piece on the side of the longitudinal axis L where the outer edge is located, and has a second fixed coupling width B2 in the extension direction of the elastic piece on the side of the longitudinal axis L where the inner edge is located. In particular, a recessed depth D of the recess 225' is greater than the first fixed coupling width B1 of the elastic piece 24', and the first fixed coupling width B1 is less than the second fixed coupling width B2. In one embodiment, the first fixed coupling width B1 of the elastic piece may be less than 3 mm, and may be, less than the first fixed coupling width B1 is set to 0, that is, the elastic piece fixed segment is only arranged between the longitudinal axis L and the inner edge.

As shown in FIG. 7, this transducing apparatus also has two bearings, which are arranged on the driving shaft 300 on a proximal side and a distal side of an elastic assembly in the direction of the longitudinal axis L, where the elastic piece 24' is closer to the bearing 26 on the proximal side.

Corresponding to the design of one elastic piece 24', the transmission arm 22' shown in FIG. 7 includes only one holding portion 223 that holds the elastic piece fixed segment. The holding portion 223 is offset relative to the longitudinal axis L, and in the case that the first fixed coupling width B1 is zero, the holding portion 223 is completely offset to one side of the longitudinal axis L. This embodiment can also reduce the damping generated by the transmission arm 22' on the side where the outer edge of the elastic piece is located, to improve the mechanical efficiency.

The transmission arms 22, 22' and the elastic pieces can be integrally formed by over-molding, but in other alternative embodiments, these two can be mounted together through another fastening device.

Figure 8:
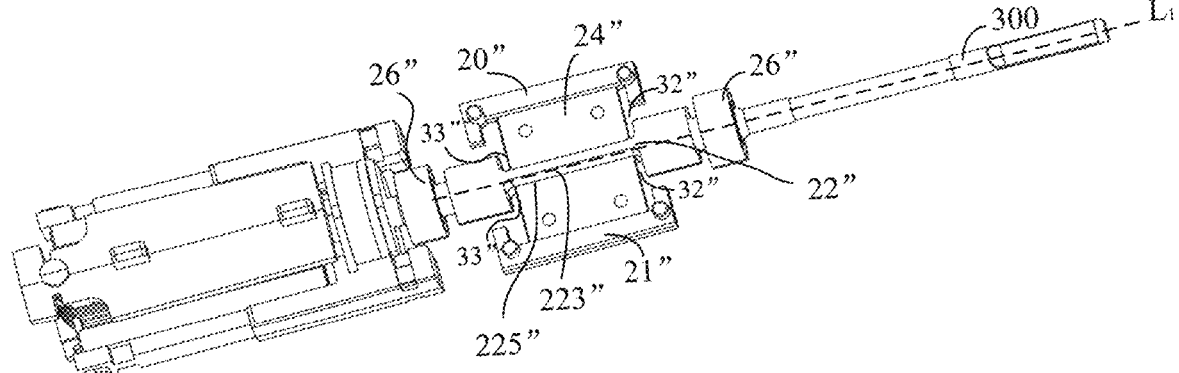
FIG. 8 is a perspective view of the transducing apparatus according to still another embodiment of the present disclosure.
Figure 9:
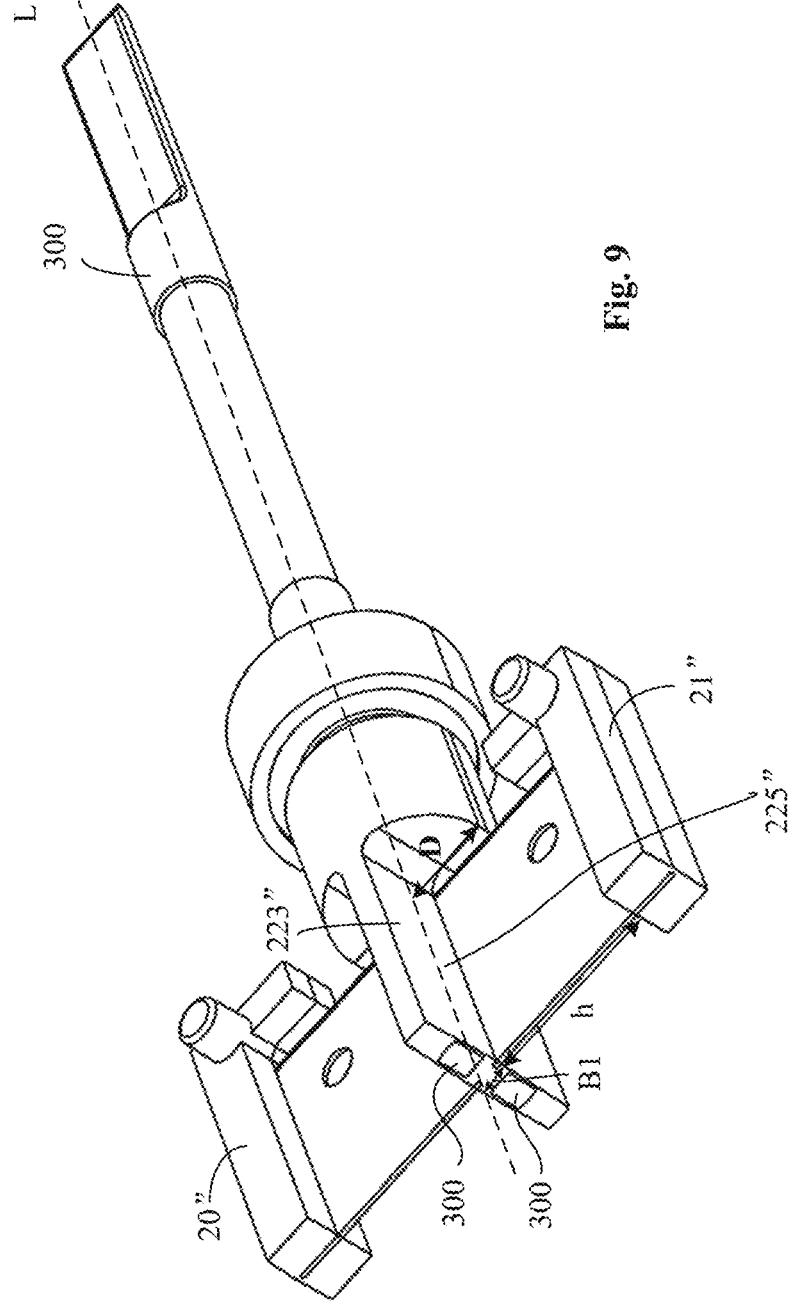
FIG. 9 is an enlarged perspective view of a portion of the transducing apparatus shown in FIG. 8.

FIG. 8 and FIG. 9 show a transducing apparatus according to still another embodiment of the present disclosure. In this transducing apparatus, the transmission arm only has one holding portion 223". The holding portion 223" is aligned relative to a longitudinal axis L. Two recesses 225" are formed on both sides of the holding portion 223", and the two recesses 225" are aligned about the longitudinal axis L. A proximal side and a distal side of a transmission arm 22" respectively have end portions that envelop portions of a driving shaft, which are generally cylindrical, and the transmission arm 22" is considered to have a cylindrical outer surface. It should be understood that this portion of the outer surface is formed as a surface that is farthest in the radial direction from bottoms of the recesses 225". In an extension plane of the elastic piece 24", a distance between the bottom surface of the recess 225" and the outer surface of the end portion on the same side as the recess is the recessed depth D, where the recessed depth D is greater than a first fixed coupling width B1 of the holding portion 223" shown in FIG. 9.

Same as the embodiments described above, in the extension direction of the elastic piece 24", the width B1 from the bottom surface of the recess 225" to the longitudinal axis L is less than 20% of the width h of a deformable segment of the elastic piece, that is, $B1/h < 20\%$.

The two elastic pieces 24" respectively extend in the two recesses 225", and may be on the same plane. The outer edges of the elastic pieces 24" are respectively held by the elastic piece fixing blocks 20" and 21", to form stationary

The invention claimed is:

1. A transducing apparatus for a cleaning and care appliance, in which the transducing apparatus comprises:

a transducer and a driving coil;

the transducer comprises a transducer frame, and a magnet, an elastic assembly and a driving shaft with a longitudinal axis L, which are attached to the transducer frame; and the elastic assembly comprises a transmission arm and at least one elastic piece held by the transmission arm, wherein the transmission arm is fixedly connected to the driving shaft;

the driving coil is arranged opposite to the magnet of the transducer, the transducer is movable relative to the driving coil, an alternating current passes through the driving coil, and an alternating electromagnetic force is generated between the driving coil and the magnet, and drives the transducer to perform a harmonic motion;

wherein the elastic piece has an outer edge away from the longitudinal axis L and an inner edge close to the longitudinal axis L, an extension direction of the elastic piece extending from the outer edge to the inner edge is transverse to the longitudinal axis L, the elastic piece has an elastic piece fixed segment held by the transmission arm on one side where the inner edge is located, and when the transducing apparatus is operating, the outer edge of the elastic piece is stationary;

the transmission arm has a holding portion that holds the elastic piece fixed segment;

corresponding to the holding portion, the transmission arm is recessed inwardly from the outer surface of the transmission arm to form a recess;

the recess has a bottom surface, and the elastic piece extends from the bottom surface of the recess and extends in a space formed by the recess;

in the extension direction of the elastic piece, the holding portion has a first fixed coupling width B1 from the bottom surface of the recess to the longitudinal axis, and the first fixed coupling width B1 is greater than or equal to zero; and in an extension plane of the elastic piece and on one side where the recess is located, a farthest radial distance between the bottom surface of the recess and the outer surface of the transmission arm on the same side as the recess is defined as a recessed depth D, wherein the recessed depth D is greater than the first fixed coupling width B1.

2. The transducing apparatus according to claim 1, wherein a width of a deformable segment of the elastic piece is h, and the first fixed coupling width B1 is less than 20% of the width h of the deformable segment.

3. The transducing apparatus according to claim 1, wherein the elastic piece extends inwardly from the outer edge toward the longitudinal axis L and across the longitudinal axis L, wherein the outer edge and the inner edge are located on opposite sides of the longitudinal axis L;

the elastic piece fixed segment has a second fixed coupling width B2 on one side of the longitudinal axis L where the inner edge is located in the extension direction of the elastic piece, wherein the first fixed coupling width B1 is less than the second fixed coupling width B2; and the holding portion is offset relative to the longitudinal axis L.

4. The transducing apparatus according to claim 3, wherein the holding portion of the transmission arm is completely offset to one side of the longitudinal axis L, and the holding portion and the outer edge of the elastic piece are on opposite sides of the longitudinal axis L.

5. The transducing apparatus according to claim 3, wherein the second holding width B2 is greater than 1 mm, and the first fixed coupling width B1 is in a range from 0 mm to 3 mm.

6. The transducing apparatus according to claim 1, wherein the at least one elastic piece of the elastic assembly comprises a first elastic piece and a second elastic piece, the recess of the transmission arm comprises a first recess and a second recess, the first recess and the second recess are recessed in opposite directions and formed on the transmission arm, and the first elastic piece and the second elastic piece extend from the transmission arm in opposite directions transverse to the longitudinal axis L respectively in spaces of the first recess and the second recess, wherein recessed depths of the first recess and the second recess are substantially equal.

7. The transducing apparatus according to claim 6, wherein the transmission arm has a first holding portion for holding the first elastic piece and a second holding portion for holding the second elastic piece, and the first holding portion and the second holding portion are offset to opposite sides of the longitudinal axis L; and the first holding portion and the second holding portion are connected through a connection portion.

8. The transducing apparatus according to claim 6, wherein the first elastic piece and the second elastic piece are held by the same holding portion, and the first recess and the second recess are located on both sides of the holding portion.

9. The transducing apparatus according to claim 1, wherein the elastic piece and a side surface of the recess are separated by a gap in the longitudinal direction.

10. The transducing apparatus according to claim 1, wherein the transducing apparatus further comprises a bearing for supporting and holding the driving shaft.

11. The transducing apparatus according to claim 10, wherein the driving shaft comprises a first driving shaft portion and a second driving shaft portion, and a proximal end and a distal end of the transmission arm are respectively fixedly connected to the first driving shaft portion and the second driving shaft portion;

the bearing comprises a proximal bearing and a distal bearing, which are respectively arranged on the first driving shaft portion and the second driving shaft portion.

12. A cleaning and caring appliance comprising:

a transducing apparatus for a cleaning and care appliance, in which the transducing apparatus comprises:

a transducer and a driving coil;

the transducer comprises a transducer frame, and a magnet, an elastic assembly and a driving shaft with a longitudinal axis L, which are attached to the transducer frame; and the elastic assembly comprises a transmission arm and at least one elastic piece held by the transmission arm, wherein the transmission arm is fixedly connected to the driving shaft;

the driving coil is arranged opposite to the magnet of the transducer, the transducer is movable relative to the driving coil, an alternating current passes through the driving coil, and an alternating electromagnetic force is generated between the driving coil and the magnet, and drives the transducer to perform a harmonic motion;

wherein the elastic piece has an outer edge away from the longitudinal axis L and an inner edge close to the longitudinal axis L, an extension direction of the elastic piece extending from the outer edge to the inner edge is transverse to the longitudinal axis L, the elastic piece has an elastic piece fixed segment held by the transmission arm on one side where the inner edge is located, and when the transducing apparatus is operating, the outer edge of the elastic piece is stationary;

the transmission arm has a holding portion that holds the elastic piece fixed segment;

corresponding to the holding portion, the transmission arm is recessed inwardly from the outer surface of the transmission arm to form a recess;

the recess has a bottom surface, and the elastic piece extends from the bottom surface of the recess and extends in a space formed by the recess;

in the extension direction of the elastic piece, the holding portion has a first fixed coupling width B1 from the bottom surface of the recess to the longitudinal axis, and the first fixed coupling width B1 is greater than or equal to zero; and in an extension plane of the elastic piece and on one side where the recess is located, a farthest radial distance between the bottom surface of the recess and the outer surface of the transmission arm on the same side as the recess is defined as a recessed depth D, wherein the recessed depth D is greater than the first fixed coupling width B1, wherein the cleaning and caring appliance comprises one of an electric toothbrush, an electric shaver, an electric facial cleaner, and an electric shower.

13. The cleaning and caring appliance according to claim 12, wherein a width of a deformable segment of the elastic piece is h, and the first fixed coupling width B1 is less than 20% of the width h of the deformable segment.

14. The cleaning and caring appliance according to claim 12, wherein the elastic piece extends inwardly from the outer edge toward the longitudinal axis L and across the longitudinal axis L, wherein the outer edge and the inner edge are located on opposite sides of the longitudinal axis L;

the elastic piece fixed segment has a second fixed coupling width B2 on one side of the longitudinal axis L where the inner edge is located in the extension direction of the elastic piece, wherein the first fixed coupling width B1 is less than the second fixed coupling width B2; and the holding portion is offset relative to the longitudinal axis L.

15. The cleaning and caring appliance according to claim 14, wherein the holding portion of the transmission arm is completely offset to one side of the longitudinal axis L, and the holding portion and the outer edge of the elastic piece are on opposite sides of the longitudinal axis L.

16. The cleaning and caring appliance according to claim 14, wherein the second holding width B2 is greater than 1 mm, and the first fixed coupling width B1 is in a range from 0 mm to 3 mm.

17. The cleaning and caring appliance according to claim 12, wherein the at least one elastic piece of the elastic assembly comprises a first elastic piece and a second elastic piece, the recess of the transmission arm comprises a first recess and a second recess, the first recess and the second recess are recessed in opposite directions and formed on the transmission arm, and the first elastic piece and the second elastic piece extend from the transmission arm in opposite directions transverse to the longitudinal axis L respectively in spaces of the first recess and the second recess, wherein recessed depths of the first recess and the second recess are substantially equal.

18. The cleaning and caring appliance according to claim 17, wherein the transmission arm has a first holding portion for holding the first elastic piece and a second holding portion for holding the second elastic piece, and the first holding portion and the second holding portion are offset to opposite sides of the longitudinal axis L; and the first holding portion and the second holding portion are connected through a connection portion.

19. The cleaning and caring appliance according to claim 18, wherein the first elastic piece and the second elastic piece are held by the same holding portion, and the first recess and the second recess are located on both sides of the holding portion.

20. The cleaning and caring appliance according to claim 12, wherein the elastic piece and a side surface of the recess are separated by a gap in the longitudinal direction.

\* \* \* \* \*